United States Patent [19]

Kennedy, Jr.

[11] Patent Number: 4,792,816

[45] Date of Patent: Dec. 20, 1988

[54] DEVICE FOR TRANSPORTING PHOTOSENSITIVE MATERIAL PAST AN IMAGING LINE IN TEXT AND GRAPHICS IMAGE SETTING APPARATUS

[75] Inventor: John A. Kennedy, Jr., Ridge, N.Y.

[73] Assignee: Dr. Ing. Rudolf Hell GmbH, Kiel, Fed. Rep. of Germany

[21] Appl. No.: 910,368

[22] Filed: Sep. 22, 1986

[51] Int. Cl.⁴ .............................................. G01D 9/42
[52] U.S. Cl. .................... 346/108; 318/685; 318/696
[58] Field of Search ................ 346/108, 136; 358/296, 358/298; 332/751; 318/685, 696

[56] References Cited

U.S. PATENT DOCUMENTS 4,293,807 10/1981 Foster et al. ......................... 318/696
4,683,408 7/1987 Inoue et al. ......................... 318/696

FOREIGN PATENT DOCUMENTS 0209834 1/1987 European Pat. Off. ............ 346/108

Primary Examiner—E. A. Goldberg
Assistant Examiner—Huan H. Tran
Attorney, Agent, or Firm—Lawrence C. Edelman

[57] ABSTRACT

Image setting apparatus is disclosed for producing two-dimensional images on photosensitive material. The apparatus includes a device for transporting the photosensitive material past an imaging line to provide a first dimension of the two-dimensional image; a light source for producing a modulated beam of light; a scanning device for converting the light beam into a scanning beam; and a scan lens in the path of the scanning beam such that a focused beam spot moves linearly and repeatedly across the photosensitive material along the imaging line to provide the other dimension of the two-dimensional image. According to the invention, the device for transporting the photosensitive material past the imaging line includes a driving roller in contact with the photosensitive material, a stepper motor mechanically coupled to rotate the driving roller and a controllable circuit, connected to the coil of the stepper motor, for incrementing the motor in microsteps upon command. The current through the motor coils is so controlled that the stepper motor may be advanced at least two thousand substantially equal microsteps per revolution, thereby permitting correction of small repeatable errors in the advance of the photosensitive material and permitting the motor to be advanced in accordance with any desired image resolution.

9 Claims, 4 Drawing Sheets

FIG.1
FIG.2
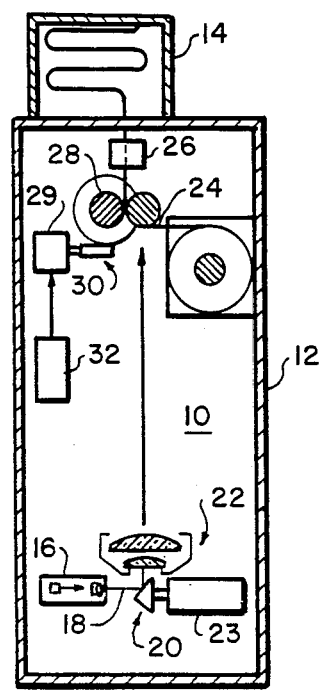
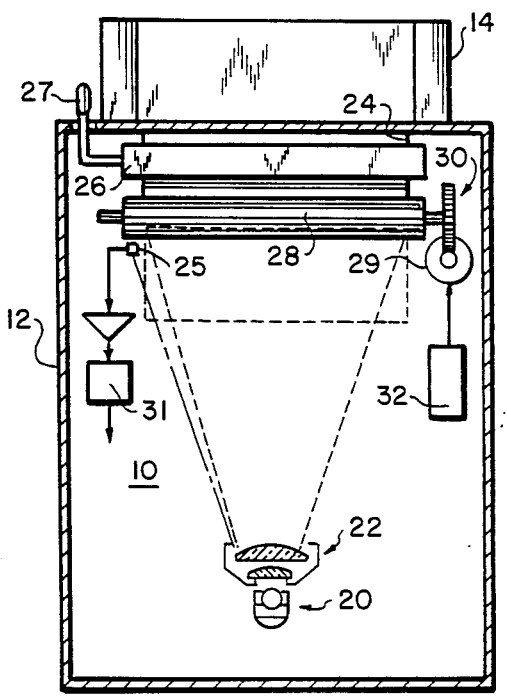
FIG.3
(PRIOR ART)
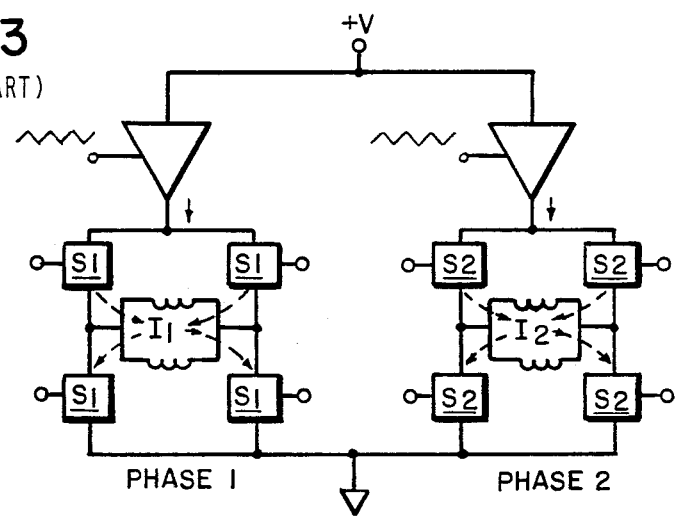

FIG.6A
FIG.6B
FIG.6C
FIG.7A  T1
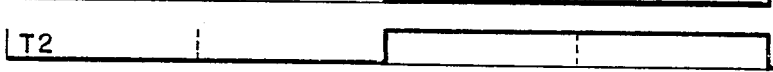
FIG.7B  T2
FIG.7C  T3
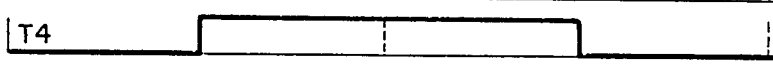
FIG.7D  T4
FIG.7E  C1
FIG.7F  C2
FIG.7G  C3
FIG.7H  C4
FIG.7I  DAC1
FIG.7J  DAC2

DEVICE FOR TRANSPORTING PHOTOSENSITIVE MATERIAL PAST AN IMAGING LINE IN TEXT AND GRAPHICS IMAGE SETTING APPARATUS

CROSS-REFERENCE TO RELATED APPLICATIONS

The subject matter of the present application is related to that disclosed in the commonly-owned U.S. Patent Application Ser. No. 757,129, filed July 19, 1985 by Walter I. Hansen and Herbert Klepper and entitled "Text and Graphics Image Setting Apparatus", now U.S. Pat. No. 4,719,474.

The subject matter is also related to that disclosed in the commonly-owned U.S. Patent Application Ser. No. 909,873, filed Sept. 22, 1986, by John A. Kennedy, Jr. and entitled "CIRCUIT FOR MODULATING A SCANNING BEAM IN A TEXT AND GRAPHICS IMAGE SETTING APPARATUS."

BACKGROUND OF THE INVENTION

The present invention relates to image setting apparatus for providing high quality, two-dimensional images on photosensitive material. More particularly, the present invention relates to a device for transporting photosensitive material past an imaging line in such apparatus to provide a variable first dimension of such two dimensional image on the photosensitive material.

Image setting apparatus of the type to which the present invention relates should be capable of providing image resolutions of up to 2400 dots per inch. This resolution may be achieved by scanning the surface of photosensitive material with the focused spot of modulated beam of electro-magnetic radiation (hereinafter "EMR") such as infrared light. The EMR beam, which may be produced by a laser, is repeatedly scanned in a linear direction across the photosensitive material to provide one dimension of the two dimensional image. The other, perpendicular image dimension is produced by repeatedly moving the photosensitive material, between or during each beam scan, in a direction perpendicular to the aforesaid beam scanning direction.

In order to obtain a resolution of 2400 dpi, the scanning beam must be electronically modulated to achieve this resolution with the particular rate of scan; the photosensitive material must also be incremented with this resolution from scan line to scan line.

The present invention relates to a device which is capable of accurately moving the photosensitive material with this, or any other desired resolution.

Devices for moving photosensitive material - particularly material of prescribed width and arbitrary length - normally include a pair of parallel rollers which are spring biased to press against each other to tightly grip the material at their nip. Either one or both of these rollers is driven by an electric stepper motor through a gear reducing drive such as a worm gear. In a typical device, the gear ratio may be 24:1 so that 24 complete revolutions of the stepper motor are required to produce one rotation of the drive roller. If, for example, the circumference of the drive roller is nominally four inches, twenty four turns of the stepper motor will move the photosensitive material by four inches so that one revolution of the stepper motor will move the photosensitive material by one sixth of an inch. With a conventional stepper motor capable of incrementing two hundred steps in one revolution, a single step of the stepper motor will move the photosensitive material by 1/6 inches times 1/200 = 1/1200th inches. If the coils of the stepper motor are energized to move the motor by a half step only, it is possible to move the photosensitive material by 1/2400th inches, thus achieving the desired resolution of 2400 dpi in the direction perpendicular to the beam scan line.

Such a photosensitive material transporting mechanism has two drawbacks, however:

(1) Since the device is operating at the limits of its resolution, it is not possible to correct for small errors caused by slippage or stretch of the photosensitive material or for errors in metering this material due to inaccuracy in roller size. Normally, such slip errors and metering errors are repeatable and consistent for any given machine so that it is possible to compensate them by providing small corrections in the stepper motor advance.

(2) Although the device for advancing photosensitive material in increments of 1/2400 inches is also capable of providing lower resolutions by advancing the material by multiple increments between or during successive scans (e.g., two increments, at 1/2400 inches per increment, results in a 1/1200 inch resolution; three increments, at 1/2400 inches per increment, results in a 1/800 inch resolution, etc.) the available lesser resolutions are specific and limited. Consequently, image setting apparatus designed to provide different resolutions in inches will not operate to provide resolutions based on pica's or metric dimensions.

It is therefore a primary object of the present invention to provide a device for transporting and advancing the photosensitive material in an image setting apparatus which eliminates the drawbacks stated above.

It is a specific object of the present invention to provide a device for transporting photosensitive material past an imaging line in an image setting apparatus, which device is capable of correcting repeatable, consistent errors, thereby improving the accuracy of the apparatus.

It is another specific object of the present invention to provide a device for transporting photosensitive material past an imaging line in an image seting apparatus, which device permits the accurate selection and adjustment of resolution in accordance with any resolution standard, thereby to make the image setting apparatus compatable with the various standards in the industry.

SUMMARY OF THE INVENTION

The above stated objects, as well as other objects which will become apparent from the discussion that follows, are achieved, according the present invention, by controlling the electrical current supplied to the coils of the stepper motor of the photosensitive material transporting device in such a way as to advance the stepper motor by a large number of equal "microsteps" per revolution. The stepper motor can therefore be incremented by exceedingly small angular movements to cause the photosensitive material to advance to the desired position to within extremely small tolerances.

According to the principles of the present invention, it is desirable if the stepper motor be advanced by at least 2000 microsteps per revolution. Such fine degree of control of the stepper motor is sufficient to permit correction of repeatable, consistent errors and to adjust the resolution of the image setter apparatus in accordance with any known standard.

In a preferred embodiment of the present invention each half-step of a conventional stepper motor is divided into 200 substantially equal sub-steps, so that there are 400×200=80,000 substantially equal microsteps per revolution. Since one revolution of the stepper motor advances the photosensitive sheet material by 1/6 inches, one microstep of the stepper motor advances the sheet material by approximately 1/6×1/80,000=1/480,000 inches.

This fine degree of control of the stepper motor may be effected by a novel circuit, according to the present invention, for controlling the current supplied to the coils of the motor. With a typical motor having two phases, and two coils in each phase, the control circuit comprises:

(1) a voltage source providing a potential drop between two terminals;

(2) a first sense resistor connected between one of the voltage source terminals and the coils of said first phase;

(3) a second sense resistor connected between the aforementioned one voltage source terminal and the coils of the second phase;

(4) a first current control device connected in series with the other voltage source terminal, the coils of the first phase and the first sense resistor, this first current control device having a first control input;

(5) a second current control device connected in series with the aforementioned other voltage source terminal, the coils of the second phase and the second sense resistor, this second current control device having a second control input;

(6) a controllable switch device, connected in series with each of the coils of the stepper motor, for selectively switching the current through each coil on and off;

(7) a first differential amplifier having two inputs and an output, its output being connected to the aforementioned control input and one of its inputs being connected to receive the voltage across the first sense resistor;

(8) a second differential amplifier having two inputs and an output, its output being connected to the aforementioned second control input and one of its inputs being connected to receive the voltage across the second sense resistor;

(9) a voltage control device, connected to the other inputs of the first and second differential amplifiers, for applying a controlled voltage to each input; and

(10) a switch control device, connected to the controllable switch device, for selectively switching the current to each coil on and off.

For a full understanding of the present invention, reference should now be made to the following detailed description of the preferred embodiments of the invention and to the accompanying drawings.

BRIEF DESCRIPTION OF THE DRAWINGS

FIG. 1 is a schematic representation, shown in side view, of the principal components of phototypesetting apparatus of the type to which the present invention relates.

FIG. 2 is a similar depiction; that is, another schematic representation as in FIG. 1, but seen from the front.

FIG. 3 is a schematic diagram of a well known circuit for controlling current in the coils of a stepper motor.

FIGS. 6A, 6B & 6C are time diagrams showing the output of the start-of-line photocell and monostable multivibrator; the active scanning period and the microprocessor interrupt impulses, in the typesetting apparatus of FIGS. 1 and 2.

FIGS. 7A, 7B, 7C, 7D, 7E, 7F, 7G, 7H, 7I & 7J are time diagrams showing, respectively, the time dependence of the four transistor switching signals; the four coil currents; and the outputs of the two digital-to-analog converters, in the circuit of FIG. 5.

DESCRIPTION OF THE PREFERRED EMBODIMENT

Figure 4A:
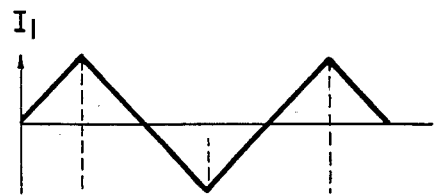
FIGS. 4A & 4B are diagrams showing the time dependence of the currents $I_1$ and $I_2$, respectively, in the circuit of FIG. 3.

The preferred embodiment of the present invention will now be described with reference to FIGS. 1-8 of the drawings. Identical elements in the various figures are designated with the same reference numerals.

FIGS. 1 & 2 show side and front views, respectively, of phototypesetting apparatus 10 of the type to which the present invention relates. This typesetting apparatus provides a two-dimensional image on photosensitive material from an electrical representation of such image. The apparatus 10 is enclosed in a housing 12 at the top of which there is provided a receptacle 14 for receiving the photosensitive material on which images have been set.

The housing 12 contains the mechanical and electrical components which form the image. These components include a source of light 16 from which there is emitted a modulated beam 18. A rotatable prism mirror reflects the beam 18 toward a scan lens 22 through which the beam passes to an image point on the photosensitive material 24.

The rotatable prism mirror 20 is provided with two mirror facets that are joined in a common line to form a triangular prism construction. The mirror or "spinner" 20 is driven by a high speed synchronous motor 23.

It will be appreciated that as the spinner 20 is rotated, the beam passing through the scan lens 22 causes a focused spot to move in rasterlike fashion along an imaging line on the material 24. The beam angle that is swept out during imaging by a given mirror facet is approximately 60°. During this period, information contained in the modulated beam is layed down on the photosensitive material 24. It will, of course, be understood that the beam sweep caused by one facet occurs one-half a revolution of the mirror 20 later than the beam sweep caused by the other facet. In between these two active periods there are dead times of approximately 120° each. During these dead times, the electronic circuitry of the system switches on the scanning beam so that the start of a scanning line can be detected by a photocell 25 and a monostable multivibrator circuit 31. At a prescribed interval following detection of the beam by the photocell 25 the scanning beam is modulated to expose the photosensitive material along the imaging line in accordance with the text and/or graphics to be produced.

Either during or after the completion of a scan line, the photosensitive material is advanced to the next scan line position by incrementing a drive roller 28 by means of a stepper motor 29 and a worm geam mechanism 30.

As the photosensitive material 24 is exposed, it is collected in the light-tight chamber 14. At the completion of a run, the material is advanced further so that all of the exposed photosensitive material is transported into the chamber 14. This material is severed by means of a cutter 26, actuated manually by a lever 27, and the chamber 14 which contains the exposed material is carried to a developing station.

It will be understood that the vertical resolution of the exposed image on the photosensitive material 24 depends entirely upon the advancement mechanism which comprises the drive roller 28, the stepper motor 29 and the worm geam 30. In the embodiment shown, the stepper motor 29 is wound in two phases with two coils in each phase to provide 200 full steps and 400 half-steps per revolution. The worm gear provides a reduction ratio of 24:1 and the drive roller has a nominal circumference of 4 inches. With this arrangement, each half-step of the stepper motor 29 advances the photosensitive sheet material by nominally 1/2400 inches. This is thus the maximum resolution which may be achieved by conventional operation of the stepper motor.

FIGS. 1 & 2 show a drive circuit 32 connected to the stepper motor 29 for supplying current to the coils of the motor. In accordance with the invention, the current is controlled so as to provide at least 2,000 substantially equal microsteps of the stepper motor per revolution. In the example shown in FIGS. 1 & 2, where each revolution of the stepper motor advances the photosensitive sheet material by 1/6 inches, each microstep would advance the sheet material by approximately $1/6 \times 1/2000 = 1/12000$ inches. This fine resolution, provided by control of the stepper motor, permits correction of small, repeatable errors in the material advance, such as errors created by a slightly larger or smaller circumference of the drive roller 28 from its nominal 4 inches. It is also sufficiently small to permit the motor to be advanced in accordance with any desired resolution.

The circuit 32 may be any conventional circuit known in the art, or it may be a novel circuit of the type described below which provides certain advantages over circuits of the prior art.

Figure 4B:
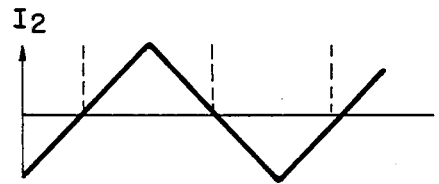

FIG. 3 illustrates a conventional bipolar drive circuit for controlling the current through the coils of a stepper motor. It is assumed that the stepper motor has two phases with two coils, in each phase. The currents $I_1$ & $I_2$ are ramped up and down, saw tooth fashion, and the four switches S1 in phase 1 and four switches S2 in phase 2 are switched to pass the currents $I_1$ and $I_2$ through the coils of the two phases, respectively, in the manner illustrated in FIGS. 4A & 4B. As shown in FIG. 3, the two coils in each phase are connected in parallel, and therefore receive equal current. As is shown in FIGS. 4A & 4B, this current continuously changes to advance the stepper motor. The current through the coils of one phase reaches a maximum when the current through the coils of the opposite phase passes through zero.

Figure 5:
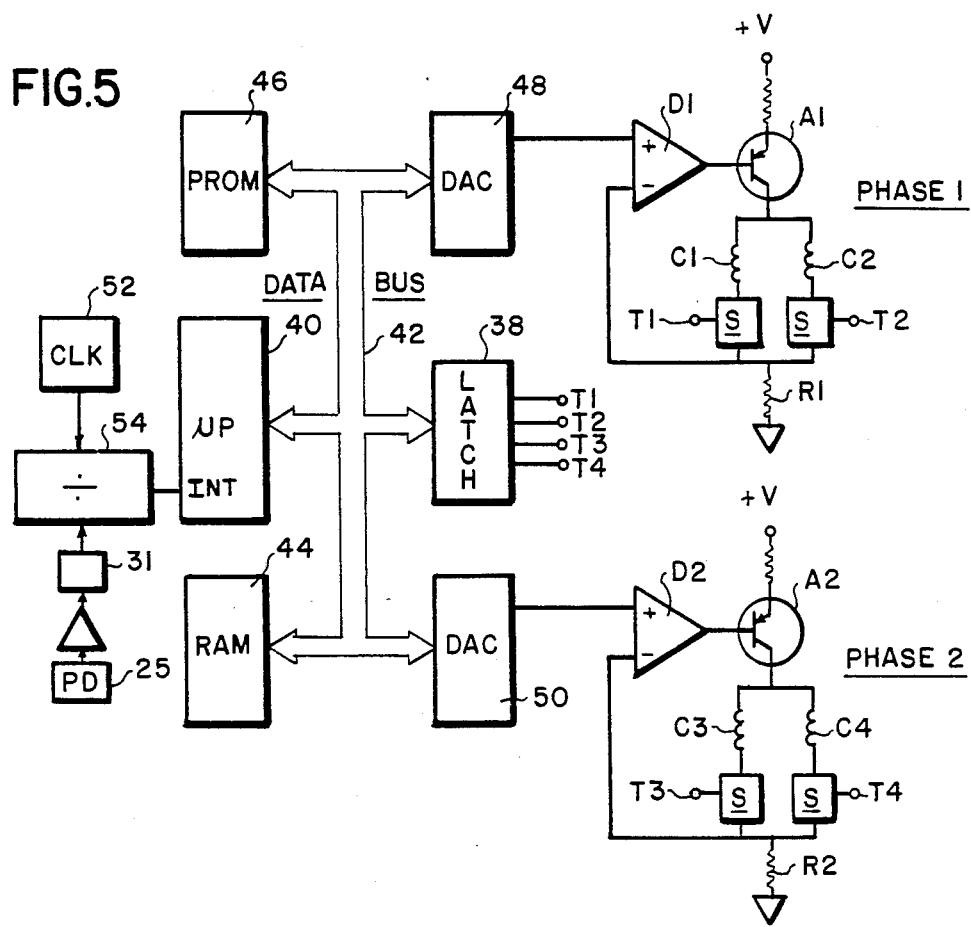
FIG. 5 is a block diagram of a preferred circuit according to the present invention for controlling current in the coils of a stepper motor.

FIG. 5 shows a unipolar drive circuit, according to the present invention, for controlling a stepper motor with a high degree of accuracy. As in the case of the stepper motor of Fig. 3, the motor has two phases, phase 1 and phase 2, with two coils C1, C2 or C3, C4, respectively, in each phase. Switches S operate to independently control the current through coils C1, C2, C3 and C4 by means of control signals T1, T2, T3 and T4. Small resistors R1 and R2 sense the current through the series circuit for each phase, formed by the coils C, the current switches S and respective current control devices (amplifiers) A1 and A2. Differential amplifiers D1 and D2, which are connected to receive the voltage across the sense resistors R1 and R2, respectively, drive the amplifiers A1 and A2, respectively, to maintain a constant current through the coils of each phase at any given voltage settings applied to their positive inputs.

The switching signals T1, T2, T3 and T4 are produced by a latch 38. A microprocessor 40, operating on a data bus 42 with a RAM 44 and a PROM 46, supplies digital signals to the latch 38 as well as to digital-to-analog converters ("DAC's") 48 and 50. The DAC's 48 and 50 supply analog signals to the differential amplifiers D1 and D2, respectively.

The microprocessor 40 thus controls the current switches S and determines the amount of current supplied in each phase by controlling the differential amplifiers D1 and D2. This control function is repeated a number of times (e.g., 20 times for a double facet spinner or 40 times for a single facet spinner) during each scan cycle of the image setting apparatus. The control program is initiated by an interrupt signal supplied to the microprocessor at a frequency determined by a click 52 and a twenty or forty counter 54 (which exists in software). The counter 54 is initiated (reset) by a pulse from the monostable MV 31 that indicates the start of a scan line.

Figure 8:
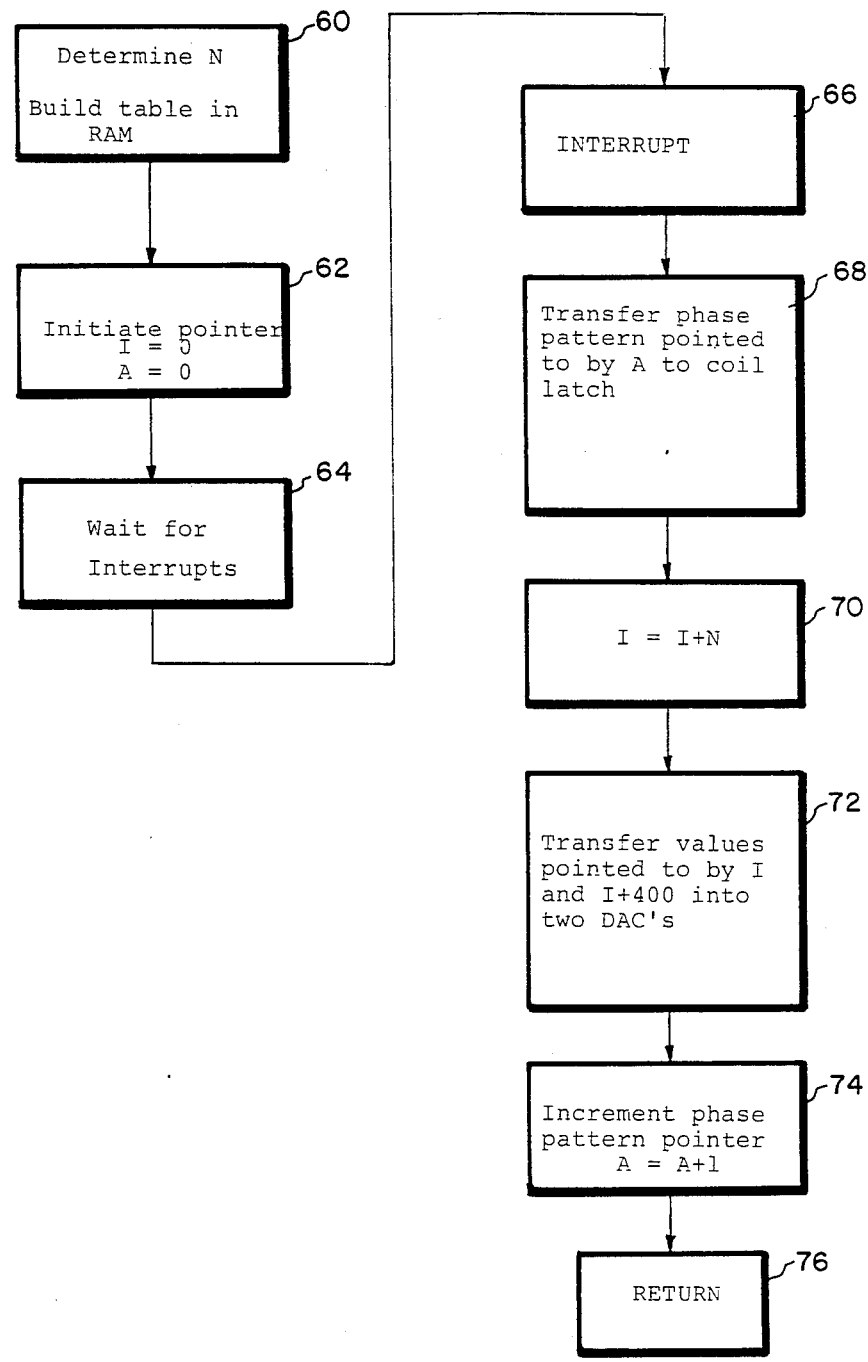
FIG. 8 is a flow diagram of a microprocessor program for the circuit of FIG. 5.

The time diagrams of FIGS. 6 and 7 illustrate the operation of the circuit of FIG. 5 and the flow chart of FIG. 8 shows the program used in the microprocessor 40.

FIG. 6A shows the sequence of pulses received from the monostable MV 31, each indicating that the laser beam is about to commence its scan of the photosensitive sheet material 24 along the imaging line. FIG. 6B indicates the actual scanning periods which, as may be seen, are initiated by the trailing edges of the "start-of-line" pulses (FIG. 6A). FIG. 6C shows successive sequences of twenty clock pulses (or forty for single facet operation), each sequence being also triggered by a start-of-line pulse (FIG. 6A). These clock pulses are supplied to the microprocessor 40 as an interrupt signal to initiate the stepper motor control program twenty (or forty) times between (and during) each scan.

In the preferred embodiment of the image setting apparatus, the start-of-line pulses occur at intervals of 5.76 ms. The active scan period is approximately 2 ms in duration, resulting in a dead time between scans of 3.76 ms.

FIGS. 7A, 7B, 7C, and 7D show the signals T1, T2, T3 and T4, respectively, which control the current through the coils C1, C2, C3 and C4 via the switches S. As will be seen from FIGS. 7A and 7B, for example, the current in one phase of the stepper motor is supplied either to one coil or to the other, but not to both. Also, by comparing FIGS. 7A and 7B with FIGS. 7C and 7D, it may be seen that the current is alternately switched in the two phases; i.e., first in the coils of one phase and then in the coils of the other.

During the period that the current is provided to each coil, this current is successively ramped up to a maximum value, held constant for a prescribed period of time and then ramped down to zero. This type of control may be seen by comparing FIG. 7E (the current in coil C1) with FIG. 7A (the switch signal T1), or comparing FIGS. 7F and 7B; FIGS. 7G and 7C; and FIGS. 7H and 7D. Such control of the current is effected by controlling the DAC 48 and DAC 50 to produce outputs of the type indicated in FIGS. 7I and 7J, respectively. These outputs are produced by first building a table in the RAM memory 44 so that this RAM first produces a succession of 200 numbers, from zero to a desired maximum value, when it is successively addressed, beginning at a starting address and proceeding through 200 consecutive addresses; then produces constant numbers, equal to the aforesaid maximum value, when successively addressed at the following 400 consecutive addresses; and finally produces 200 successively decreasing numbers, from the maximum value back to zero, when successively addressed of the following 200 consecutive addresses. These numbers are applied to each DAC as selected by the microprocessor 40.

It will also be noted from FIGS. 7E–7H that the current through one coil in one phase is held constant while the current through another coil in another phase is varied. Thus, current is passed through only two coils (one in each phase) at any one time and the current in one coil is always held constant while the current in the other coil is incremented or decremented in fine (i.e., 200) steps. This results in extremely stable motor operation since the current change in one coil cannot effect the current in any other coil.

Furthermore, this arrangement makes it possible to divide each step of the stepper motor into twice the number of microsteps as the current applied to any one coil. In this example, when the current of each DAC is increased in 200 equal steps (from zero to its maximum value), there will be a total of 400 equal current steps applied to the motor so that each step of the motor will be divided into 400 microsteps.

FIG. 8 is a flow diagram of the microprocessor program contained in the PROM 46. The general procedure of this program is to determine a number (called "N") of microsteps that the stepper motor is to be moved during each interrupt. This number depends upon the chosen resolution of the typeswtter and the desired correction due to inaccuracies in the size of the drive roller. The number is used to increment an address pointer for the RAM 44 containing the ramp table referred to above.

Specifically, if one full step of the motor advances the photosensitive material by 1/1200 inches the number of steps per scan line (called "S") will be equal to:

$$1200 \text{ steps per inch}/R = S,$$

where R is the chosen resolution (e.g., 1200 dpi, 2400 dpi, etc.).

If there are 400 microsteps for each step of the motor, and 20 interrupts for each scan line, we have:

$$S \times 400/20 = N,$$

where N=the number of microsteps per interrupt at resolution R.

This number N is then adjusted for the inaccuracy in the material advance mechanism, which leads to a slight error in the assumed value of 1200 steps per inch.

Initially, it is empirically determined how many motor steps (S') are required to correct the advance of the photosensitive material for scanning exactly 8 inches. It is then possible to calculate:

$$S'/(8 \times 1200) = \text{No. steps per scan to correct, or}$$

$$S' \times 400/(8 \times 1200 \times 20) = \text{No. microsteps per scan to correct.}$$

With 20 interrupts per scan, we have:

$$S' \times 400/(8 \times 1200 \times 20) \times 20 = \text{No. of microsteps per interrupt to correct} = N',$$

or:

$$S'/480 = N'$$

Therefore, we set N=N (previously determined)+N' (correction). N and N' are calculated and stored with four significant digits to the right of the decimal point (in hexadecimal) in order to virtually eliminate the accumulated error from the repetitive addition as described below.

After having calculated the number N (block 60 in the flow chart of FIG. 8) the RAM address pointer I as well as a "phase pattern" pointer A are reset to 0 (block 62). The "phase patterns" are simply the successive binary signals which must be supplied to the latch 38 to produce the desired signals T1, T2, T3, and T4 in the sequence shown in FIGS. 7A–7D. Thereafter, the program waits for the next interrupt (block 64).

Upon receipt of the interrupt (block 66), the microprocessor transfers the phase pattern, pointed to by the variable A, to the coil latch 38 (block 68). The RAM address pointer I is then incremented by the number N (block 70) and the RAM values pointed to by I, as well as the number I plus 400 (half the distance through the 800 total numbers in the pattern stored in RAM), are transferred to the DAC 48 and DAC 50, respectively (block 72). Thereafter, the phase pattern pointer A is incremented (block 74) and the program returns (block 76) to wait for the next interrupt (block 64).

In conclusion, it may be seen that the stepper motor control circuit according to the present invention makes it possible to select any desired image resolution, and to correct for a consistent, repeatable error in the distance between successive scan lines, in a phototypesetting machine.

There has thus been shown and described a novel device for transporting photosensitive material in an image setting apparatus which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. Image setting apparatus for producing a two-dimentional image on photosensitive material, said apparatus comprising, in combination:
   (a) means for transporting said photosensitive material past an imaging line to provide a variable first dimension of said two-dimensional image on said photosensitive material, said imaging line extending in a direction perpendicular to the direction of transport of said photosensitive material, said transporting means comprising:
  (1) at least one driving roller in contact with said photosensitive material;
  (2) a stepper motor mechanically coupled to rotate said driving roller, stepwise rotation of said driving roller causing an advance of said photosensitive material by an amount which deviates a fixed amount from a nominal amount, said nominal amount being equal to the desired longitudinal resolution of said image and said fixed amount being determined at least in part by the dimensional tolerances of said driving roller, said stepper motor having first and second phases, with at least two coils in each phase; and
  (3) controllable circuit means connected to said coils of said stepper motor for rotating said motor in microsteps upon command, a plurality of said microsteps causing an advance of said photosensitive material by approximately said nominal amount, said circuit means comprising:
    (i) memory means having stored at sequential addressable locations therein digital signals representative of a current waveform to be applied to said coils for causing stepping of said motor;
    (ii) microprocessor means for incrementally developing sequential address signals which are applied to said memory means for causing readout of the digital signals stored therein, said microprocessor means initially calculating an address correction factor and then using said address correction factor for determining the incremental change between said sequential addresses which are applied to said memory means;
    (iii) controlled means responsive to said microprocessor means and coupled to said coils for causing current to flow through selected ones of said coils in response to said digital signals readout from said memory;
  said controllable current means thereby permitting correction of small repeatable errors in the advance of said photosensitive material and permitting said motor to be advanced in accordance with any desired resolution;
(b) a controllable source of electromagnetic radiation ("EMR") for producing a modulated EMR beam; and
(c) scanning means for converting said EMR beam into a scanning beam such that a focused beam spot moves repeatedly in a linear direction across said photosensitive material on said imaging line to provide the other dimension of said two-dimensional image on said photosensitive material.

2. Apparatus as defined in claim 1, wherein said stepper motor is coupled to rotate said driving roller by a gear-reducing worm gear drive.

3. Apparatus as defined in claim 1, wherein said current controlling means controls said current through said motor coils such that the current supplied to at least one of said coils is held at a constant maximum value while the current supplied to at least one other of said coils is varied.

4. Apparatus as defined in claim 1, wherein said stepper motor has two phases and two coils in each phase, and wherein said current controlling means controls said current through said motor coils such that current is supplied to only one coil in each phase at any one time.

5. Image setting apparatus for producing a two-dimensional image on photosensitive material, said apparatus comprising, in combination:
(a) means for transporting said photosensitive material past an imaging line to provide a variable first dimension of said two-dimensional image on said photosensitive material, said imaging line extending in a direction perpendicular to the direction of transport of said photosensitive material, said transporting means comprising:
  (1) at least one driving roller in contact with said photosensitive material;
  (b 2) a stepper motor mechanically coupled to rotate said driving roller, stepwise rotation of said driving roller causing an advance of said photosensitive material by a preset nominal amount of said variable first dimension, said stepper motor having first and second phases, with at least two coils in each phase; and
  (3) controllable circuit means connected to said coils of said stepper motor for rotating said motor in microsteps upon command, a plurality of said microsteps causing an advance of said photosensitive material by approximately said nominal amount, said circuit means comprising:
    (i) a voltage source providing a potential drop between two terminals;
    (ii) a first sense resistor connected between one of said voltage source terminals and said coils of said first phase;
    (iii) a second sense resistor connected between said one voltage source terminal and said coils of said second phase;
    (iv) first current control means connected in series with the other of said voltage source terminals, said coils of said first phase and said first sense resistor, said first current control means having a first control input;
    (v) second current control means connected in series with said other voltage source terminal, said coils of said second phase and said second sense resistor, said second current control means having a second control input;
    (vi) controllable switch means, connected in series with each of the coils of said stepper motor, for selectively switching the current through each coil on and off;
    (vii) a first differential amplifier having two inputs and an output, said output being connected to said first control input and one of said inputs being connected to receive the voltage across said first sense resistor;
    (viii) a second differential amplifier having two inputs and an output, said output being connected to said second control input and one of said inputs being connected to receive the voltage across said second sense resistor;
    (ix) memory means having stored at sequential addressable locations therein digital signals representative of a current wave form to be applied to said coils for causing stepping of said motor;
    (x) microprocessor means for incrementally developing sequential address signals which are applied to said memory means for causing readout of the digital signals stored therein, said microprocessor means initially calculating an address correction factor and then using said address correction factor for determining the incremental change between said sequential addresses which are applied to said memory means;

(xi) digital-to-analog conversion means response to said digital signals read-out of said memory means and connected to the other inputs of said first and second differential amplifiers, for applying a controlled voltage to each input; and (xii) switch control means, connected to said controllable switch means, for selectively switching the current to each coil on and off;

(b) a controllable source of electromagnetic radiation ("EMR") for producing a modulated EMR beam; and (c) scanning means for converting said EMR beam into a scanning beam such that a focused beam spot moves repeatedly in a linear direction across said photosensitive material on said imaging line to provide the other dimension of said two-dimensional image on said photosensitive material.

6. Apparatus as defined in claim 5, wherein said stepper motor is coupled to rotate said driving roller by a gear-reducing worm gear drive.

7. Apparatus as defined in claim 5, wherein said digital-to-analog conversion means applies control voltages to said differential amplifiers and said switch control means is responsive to said microprocessor means for selectively switching the current to said motor coils on and off, such that the current supplied to at least one of said coils is held at a constant maximum value while the current supplied to at least one other of said coils is varied.

8. Apparatus as defined in claim 5, wherein said stepper motor has two phases and two coils in each phase, and wherein said microprocessor means is programmed to cause readout of said digital signals and to selectively switch the current to said motor coils on and off such that current is supplied to only one coil in each phase at any one time.

9. Apparatus as defined in claim 1, wherein said controlled means comprises:
digital-to-analog converter means coupled between said memory means and said motor coils;
latch circuit means responsive to said microprocessor means for developing switch control signals; and
a switch arrangement coupled to each of said motor coils, each switch arrangement being responsive to a respective switch control signal for selectively controlling energization of a respective one of said motor coils.

* * * * *